(12) United States Patent
Vanderstappen et al.

(10) Patent No.: US 7,323,239 B2
(45) Date of Patent: Jan. 29, 2008

(54) PROTECTIVE FILMS

(75) Inventors: Hugo Vanderstappen, Kontich (BE); Linda Maria Gisele Roberta Van Den Bossche, Zwijndrecht (BE); Kenneth Lewtas, Tervuren (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 530 days.

(21) Appl. No.: 10/492,345

(22) PCT Filed: Oct. 22, 2002

(86) PCT No.: PCT/US02/33487

§ 371 (c)(1),
(2), (4) Date: Apr. 9, 2004

(87) PCT Pub. No.: WO03/039860

PCT Pub. Date: May 15, 2003

(65) Prior Publication Data

US 2006/0263620 A1 Nov. 23, 2006

(30) Foreign Application Priority Data

Oct. 22, 2001 (GB) ................................. 0125319.4

(51) Int. Cl.
B32B 7/02 (2006.01)
B32B 27/32 (2006.01)

(52) U.S. Cl. ................... 428/216; 428/212; 428/213; 428/214; 428/215; 428/220; 428/516; 264/173.16; 156/242; 156/244.11

(58) Field of Classification Search ........... 428/216, 428/212, 213, 214, 215, 220, 516; 264/173.16; 156/242, 244.11
See application file for complete search history.

(56) References Cited

U.S. PATENT DOCUMENTS

| | | | |
|---|---|---|---|
| 3,558,399 A | 1/1971 | Turner | 156/308 |
| 3,625,727 A | 12/1971 | Lightfoot et al. | 117/6 |
| 3,778,398 A | 12/1973 | Mestetsky | 260/28.5 R |
| 3,819,581 A | 6/1974 | Smith | 260/47 EN |
| 3,926,878 A | 12/1975 | Shimizu et al. | 260/27 EV |
| 3,933,691 A | 1/1976 | Lindemann | 260/2.5 L |
| 4,001,158 A | 1/1977 | Lindemann | 260/29.6 TA |
| 4,010,130 A | 3/1977 | Matsuo et al. | 260/28.5 AV |
| 4,020,228 A | 4/1977 | Eastes | 428/347 |
| 4,022,850 A | 5/1977 | Booth et al. | 260/897 B |
| 4,048,378 A | 9/1977 | Pelzek | 428/483 |
| 4,127,619 A | 11/1978 | Godfrey | 260/889 |
| 4,256,622 A | 3/1981 | Smith | 260/33.2 R |
| 4,287,034 A | 9/1981 | Pieslak et al. | 204/147 |
| 4,337,284 A | 6/1982 | Cooper et al. | 428/35 |
| 4,351,928 A | 9/1982 | Smith | 525/443 |
| 4,362,784 A | 12/1982 | Kato et al. | 428/340 |
| 4,366,662 A | 1/1983 | Katsura et al. | 53/478 |
| 4,452,835 A | 6/1984 | Vasudevan | 428/35 |
| 4,476,896 A | 10/1984 | Schirmer | 137/561 A |
| 4,477,501 A | 10/1984 | Kojima et al. | 428/35 |
| 4,497,941 A | 2/1985 | Aliani et al. | 526/331 |
| 4,559,266 A * | 12/1985 | Misasa et al. | 428/341 |
| 4,585,682 A | 4/1986 | Colarusso et al. | 428/57 |
| 4,613,632 A | 9/1986 | Aliani et al. | 523/172 |
| 4,632,784 A | 12/1986 | Baggiolini et al. | 260/397.2 |
| 4,670,349 A | 6/1987 | Nakagawa et al. | 428/516 |
| 4,710,190 A | 12/1987 | Wood et al. | 604/389 |
| 4,731,282 A | 3/1988 | Tsukagoshi et al. | 428/220 |
| 4,741,957 A | 5/1988 | Park | 428/349 |
| 4,801,485 A | 1/1989 | Sallee et al. | 428/198 |
| 4,846,827 A | 7/1989 | Sallee et al. | 604/385.2 |
| 4,852,754 A | 8/1989 | Holdsworth et al. | 215/347 |
| 4,921,749 A | 5/1990 | Bossaert et al. | 428/216 |
| 4,981,734 A | 1/1991 | Akao et al. | 428/35.9 |
| 4,988,467 A | 1/1991 | Holdsworth et al. | 264/46.6 |
| 5,024,887 A | 6/1991 | Yamane | 428/335 |
| 5,075,156 A | 12/1991 | Tanaka et al. | 428/212 |
| 5,100,721 A | 3/1992 | Akao | 428/218 |
| 5,128,397 A | 7/1992 | Horsey et al. | 524/290 |
| 5,141,809 A | 8/1992 | Arvedson et al. | 428/349 |
| 5,154,981 A | 10/1992 | Brant et al. | 428/520 |

(Continued)

FOREIGN PATENT DOCUMENTS

| | | | | |
|---|---|---|---|---|
| CA | 1 011 034 | 5/1977 | | 402/263 |
| EP | 0078122 | 5/1983 | | |
| EP | 0 281 694 A1 | 9/1988 | | |
| EP | 0 078 122 B1 | 1/1989 | | |
| EP | 0 301 867 A2 | 2/1989 | | |

(Continued)

OTHER PUBLICATIONS

Abstract, EP 0 299 844, "Visual intensity restrictor for cataract sufferers—scans field of view using electronic shutter so that instantaneous receipt of light is confined to small area of eye", (Jan. 18, 1989).
Abstract, EP 0 299 884, "Flexible self-adhesive film for temporary protection", (Jan. 18, 1989).

(Continued)

Primary Examiner—Milton I. Cano
Assistant Examiner—David J. Joy (57) ABSTRACT

Multilayer protective films that adhere well to many different surfaces and can be removed without leaving residues are provided. The films consist of a polyolefin backing layer(s) and an adhering layer consisting of an ethylene unsaturated ester copolymer layer containing a resin. The films have good tensile strength and stiffness at minimum thickness and can be produced by blown film and cast processes, mono and co-extrusion. The films are particularly useful for protecting automobiles during transportation and storage, a masterbatch of the resin in an ethylene polymer or copolymer to facilitate co-extrusion of the multilayer films is also provided.

22 Claims, 4 Drawing Sheets

U.S. PATENT DOCUMENTS

| | | | | |
|---|---|---|---|---|
| RE34,122 | E | 11/1992 | Sheehan et al. | 156/327 |
| 5,178,960 | A | 1/1993 | Cook | 428/461 |
| 5,183,706 | A | 2/1993 | Bekele | 428/349 |
| 5,215,809 | A | 6/1993 | Hoso et al. | 428/193 |
| 5,217,812 | A | 6/1993 | Lee | 428/461 |
| 5,300,353 | A | 4/1994 | Yoshimura et al. | 428/213 |
| 5,340,649 | A | 8/1994 | Roeker et al. | 428/344 |
| 5,362,792 | A | 11/1994 | Maayeh | 524/491 |
| 5,373,049 | A | 12/1994 | Ornstern et al. | 524/487 |
| 5,512,124 | A | 4/1996 | Hansen | 156/334 |
| 5,530,065 | A | 6/1996 | Farley et al. | 525/240 |
| 5,541,246 | A | 7/1996 | Dandreaux et al. | 524/272 |
| 5,643,676 | A | 7/1997 | Dobashi et al. | 428/411.1 |
| 5,703,153 | A | 12/1997 | Maayeh | 524/499 |
| 5,766,714 | A | 6/1998 | Profetto et al. | 428/40.1 |
| 5,895,714 | A | 4/1999 | Malek | 428/337 |
| 6,017,998 | A | 1/2000 | Duan et al. | 524/591 |
| 6,060,425 | A | 5/2000 | Morohoshi et al. | 503/200 |
| 6,063,462 | A | 5/2000 | Tsukamoto et al. | 428/36.7 |
| 6,094,889 | A | 8/2000 | Van Loon et al. | 53/450 |
| 6,225,520 | B1 | 5/2001 | Bauduin et al. | 602/52 |
| 6,376,095 | B1 | 4/2002 | Cheung et al. | 428/516 |
| 2002/0006498 | A1 * | 1/2002 | Migliorini et al. | 428/195 |

FOREIGN PATENT DOCUMENTS

| | | |
|---|---|---|
| EP | 0 301 867 A3 | 2/1989 |
| EP | 0 340 990 A2 | 11/1989 |
| EP | 0 147 088 B1 | 5/1990 |
| EP | 0 369 705 A2 | 5/1990 |
| EP | 0369705 | 5/1990 |
| EP | 0 247 898 B1 | 11/1990 |
| EP | 0 353 224 B1 | 1/1991 |
| EP | 0 188 901 B1 | 6/1991 |
| EP | 0 247 896 B1 | 6/1991 |
| EP | 0 263 882 B1 | 10/1991 |
| EP | 0 299 884 B1 | 12/1991 |
| EP | 0 299 844 B1 | 5/1993 |
| EP | 0 592 913 B1 | 4/1994 |
| EP | 0 424 761 B1 | 7/1994 |
| EP | 0 622 430 B2 | 11/1994 |
| EP | 0 761 315 B1 | 3/1997 |
| EP | 0 826 754 A2 | 3/1998 |
| EP | 0 826 754 A3 | 3/1998 |
| EP | 0 679 685 B1 | 9/1998 |
| EP | 0 827 526 B1 | 8/1999 |
| EP | 0 608 175 B1 | 11/1999 |
| FR | 2 600 981 A3 | 1/1988 |
| FR | 2 807 442 A1 | 10/2001 |
| FR | 2 807 443 A1 | 10/2001 |
| GB | 1 049 033 | 11/1966 |
| GB | 2 138 008 A | 10/1974 |
| GB | 1377206 | 12/1974 |
| GB | 1 401 880 | 8/1975 |
| GB | 2138008 | 10/1984 |
| GB | 2 277 479 A | 11/1994 |
| JP | 51114480 | 10/1976 |
| JP | 58-47038 | 3/1983 |
| JP | HEI 4(1992)239081 | 8/1992 |
| JP | 09227840 | 9/1997 |
| JP | 02222479 | 8/2002 |
| WO | WO 87/07216 | 12/1987 |
| WO | WO 91/06609 | 5/1991 |
| WO | WO 94/19414 | 9/1994 |
| WO | WO 98/37139 | 8/1998 |
| WO | WO 98/37140 | 8/1998 |
| WO | WO 98/37141 | 8/1998 |
| WO | WO 98/37142 | 8/1998 |
| WO | WO 98/37143 | 8/1998 |
| WO | WO 9955528 A1 * | 11/1999 |
| WO | WO 00/00657 | 2/2000 |
| WO | WO 00/78859 | 12/2000 |
| WO | WO 02/18510 | 8/2001 |
| WO | WO 0198081 A2 * | 12/2001 |
| WO | WO 0198406 A2 * | 12/2001 |
| WO | WO 02/36703 | 5/2002 |

OTHER PUBLICATIONS

Abstract, EP 0 592 913, "Films of copolymers of alpha-olefins and unsaturated polar monomers for protecting automobile surfaces", (Apr. 20, 1994).
Abstract, EP 0 608 175, "Pressure-sensitive adhesive-coated films for protection of surfaces of plastic moldings", (Jul. 27, 1994).
Abstract, EP 0 622,430 (DE 4 313 542), "Ethylene-vinyl acetate copolymer film for lamination of nonmetallic substrates", (Nov. 2, 1994).
Abstract, EP 0 761 315 (DE 1 953 2220), "Self-adhesive protective film", (Mar. 6, 1997).
Abstract, EP 0 826 754 (DE 1 963 5704), "Self-adhesive protective plastic film", (Mar. 5, 1998).
Abstract, FR 260 0981, "Flexible adhesive tape for temporary protection of fragile surface and manufacturing method", (Jan. 8, 1988).
Abstract, FR 280 7442, "Paraffin-free EVA-based hot-melt adhesive for fabricating thermo-sealable products in molds", (Oct. 12, 2001).
Abstract, FR 280 7443, "Paraffin-free EVA-based hot-melt adhesive for fabricating thermo-sealable products in molds", (Oct. 12, 2001).
Abstract ZA 6803092, "Extrusion-coating of ethylene-vinyl acetate copolymer coatings", B.W. Elliott, (Nov. 12, 1968).
Abstract, BE 808488, "Self adhesive, transparent packaging film—consisting of mixture of ethylene/vinyl ester copolymer and hydrocarbon resin, polybutene or polyisobutene", (Dec. 14, 1972).
Abstract, DE 2549612, "Hydrocarbon resins", (Nov. 5, 1975).
Abstract, FR 1573940, "Adhesives for soil facing", (Jul. 11, 1969).
Abstract, EP 884173, "Oxygen-absorbing multilayer film and oxygen-absorbing packaging container therefrom with concealed deoxidizing agent discoloration", (Jun. 12, 1998).
Abstract, EP 830953, "Multilayered thermal-transfer medium from water-based formulation", (Sep. 22, 1997).
Abstract, EP 810087, "Heat-shrinkable multilayer films having excellent sealing properties for use as vacuum shrink packages and food packages", (May 28, 1997).
Abstract, EP 803559, "Hot-melt adhesive compositions containing ethylene-.alpha.-olefin copolymer and carboxylated polyethylene for packaging", (Apr. 23, 1997).
Abstract, EP 679685, "Ethylene copolymer composition for extruded sheet and film", (Apr. 25, 1995).
Abstract, EP 445955, "Ethylene polymer blends for heat sealable packaging films", (Feb. 27, 1991).
Abstract, EP 312288, "Manufacture of heat-sealable polyolefin films", (Oct. 11, 1988).
Abstract, EP 240253, "Resin Emulsions", (Mar. 26, 1987).
Abstract, EP 129310, "Sealing gaskets, and container closures incorporating them", (Apr. 18, 1984).
Abstract, DP 01113241, "Multilayer Sheet for Light-Weight Container", (May 1, 1989).
Abstract, JP 0145775, "Peelable Surface Protective Film", (Aug. 30, 1983).
Abstract, JP 0198383, "Surface Protecting Film", (Jul. 17, 1992).
Abstract, JP 02198841, "Heat-Sealing Cover Material", (Aug. 7, 1990).
Abstract, JP 03020382, "Hot-Melt Adhesive Composition", (Jan. 29, 1991).
Abstract, JP 04239080, "Self-adhesive tape and its manufacture", (Aug. 26, 1992).
Abstract, JP 04239081, "Surface Protective Film", (Aug. 26, 1992).
Abstract, JP 06345911, "Resin Composition for Print Laminate", (Dec. 20, 1994).
Abstract, JP 08060111, "Surface-Protective Film", (Mar. 5, 1996).
Abstract, JP 08325338, "Tackifying Agent for Ethylenic Copolymer and its Adhesive Composition", (Dec. 10, 1996).
Abstract, JP 10158593, "Thermoplastic Film Resin", (Jun. 16, 1998).

Abstract, JP 10219215, "Hot Melt Adhesive Composition", (Aug. 18, 1998).
Abstract, JP 11020097, "Sealing Film for Electronic Device", (Jan. 26, 1999).
Abstract, JP 2001 207145, "Hot-Melt Adhesive Composition", (Jul. 31, 2001).
Abstract, JP 54160482, "Coated polyethylene films for covering metals", (Jun. 9, 1978).
Abstract, JP 54046282, "Surface Protective Film", (Apr. 12, 1979).
Abstract, JP 50034048, Ethylene-vinyl Acetate Copolymer Packaging Films, (Jul. 26, 1973).
Abstract, JP 50123139, "Resin Adhesives for Polyolefin Resins", (Mar. 18, 1974).
Abstract, JP 52015094, "Assembly and Transfer Apparatus of Ship Body Block", (Feb. 4, 1977).
Abstract, JP 53112983, "Laminated Film", (Oct. 2, 1978).
Abstract, JP 54119535, "Heat-Active Adhesive Composition Capable of Extrusion Coating", (Sep. 17, 1979).
Abstract, JP 55084659, "Films for heat-seal", (Dec. 22, 1978).
Abstract, JP 56049264, "Heat-shrinkable laminated films", (Sep. 27, 1979).
Abstract, JP 57008234, "Heat-Sealable Resin Composition", (Jan. 16, 1982).
Abstract, JP 57158276, "Hot-Melt Adhesive Composition", (Sep. 30, 1982).
Abstract, JP 58015545, "Heat-Sealable Resin Composition", (Jan. 28, 1983).
Abstract, JP 61183371, "Heat-Sealable Resin Composition", (Aug. 16, 1986).
Abstract, JP 62149775, "Hot-Melt Adhesive", (Jul. 3, 1987).
Abstract, JP 51114480, "A Method for Manufacturing a Laminate", (Oct. 8, 1976).
Abstract, JP 52073987, "Laminates", (Jun. 21, 1977).
Abstract, JP 53069792, "Easily Separable Material for Package", (Jun. 21, 1978).
Abstract, JP 58051130, "Polyethylene-coated Steel Pipe", (Mar. 25, 1983).
Abstract, JP 59050295, "Plastics coated tubes for e.g. underground pipelines—using compsn. Contg. Crosslinked and non-crosslinked polyolefin resins, colourant, carbon black UV absorber, antioxidant, etc." (Aug. 31, 1988).
Abstract, JP 63003743, "Vinyl copolymers for heat-sealable lids", (Oct. 31, 1979).
Abstract, JP 9207280, "Heat-Resistant Protective Film", (Aug. 12, 1997).
Abstract, JP Kokai (A) 2-222479, "Adhesive", (Sep. 5, 1990).
Abstract, JP Kokai (A) 54-160482, "Laminated Film", (Dec. 19, 1979).
Abstract, JP 2001081420, "Hot-tack pressure-sensitive adhesive sheets", (Mar. 27, 2001).
Abstract, JP 2000052526, "Decorative sheets for furnitures and building interiors", (Aug. 7, 1998).
Abstract, JP 11138720, "Low-temperature sealable composite films with high heat seal strength and good hot tack properties", (Nov. 11, 1997).
Abstract, JP10120841, "Polyethylene-type resin compositions for extrusion lamination and their extruded laminates with improved heat sealability at low temperature", (Oct. 18, 1996).
Abstract, JP 09327888, "Paper laminates and their packagings for liquids", (Jun. 11, 1996).
Abstract, JP 09277449, "Thermosetting resin laminate decorative materials for furnitures and building materials and their manufacture", (Apr. 16, 1996).
Abstract, JP 08003384, "Ethylenic resin compositions for food packaging films", (Jun. 24, 1994).
Abstract, JP 05043752, "Hot tack and heating sealing properties of EVOH", (Aug. 9, 1991).
Abstract, JP 01268742, "Resin compositions for high-speed extrusion molding and method of laminating", (Apr. 19, 1988).
Abstract, JP 60044540, "Linear low-density polyethylene resin compositions", (Aug. 19, 1983).
Abstract, JP 59179643, "Composition for extrusion molding", (Mar. 31, 1983).

Abstract, JP 59066437, "Resin compositions for films", (Oct. 8, 1982).
Abstract, JP 58037037, "Polyethylene blends with good extrusion processability", (Aug. 28, 1981).
Abstract, JP 58001558, "Laminated packaging films with good processability", (Jun. 26, 1981).
Abstract, JP 11070505, "Scratch-resistant decorative wood materials laminated with plastic composite films with good surface appearance and bendability and manufacture thereof", (May 21, 1998).
Abstract, JP 10071660, "Hot-melt adhesives-containing disposable products with excellent water absorbing properties", (Apr. 11, 1997).
Abstract, JP 09104727, "Vinyl acetate-grafted hydrocarbon resins as tackifiers for hot-melt adhesives", (Oct. 9, 1995).
Abstract, JP 06345911, "Resin compositions for lamination on printed materials", (Jun. 11, 1993).
Abstract, JP 05117628, "Moldable sealants for use in automobiles", (Oct. 31, 1991).
Abstract, JP 02150386, "Heat-sensitive transfer printing inks", (Dec. 1, 1988).
Abstract, JP 62263203, "Hydrocarbon resins as additives for adhesives", (May 12, 1986).
Abstract, JP 62149775, "Hot-melt adhesives", (Dec. 16, 1985).
Abstract, JP 57158276, "Hot-melt adhesive compositions", (Mar. 26, 1981).
Abstract, JP 57008234, "Heat-sealable resin compositions", (Jun. 17, 1980).
Abstract, JP 56028257, "Hot-melt adhesive compositions", (Aug. 15, 1979).
Abstract, JP 52015094, "Heat-sealable polyester film laminates", (Jul. 30, 1973).
Abstract, JP 51114480, "Heat-sealable plastic laminates", (Apr. 1, 1975).
Abstract, JP 50119034, "Hot-melt adhesives", (Mar. 5, 1974).
Abstract, JP 61162539, "Modified polyolefin compsn. for adhesion—comprises ethylene-alpha-olefin random copolymer, tackifier and modified polyethylene", (Sep. 22, 1993).
Abstract, JP 55079268, "Laminated packaging material—comprising substrate, and resin layer comprising EVA copolymer and polymer of ethylene or alpha-olefin with unsatd. carboxylic acid", (Sep. 2, 1993).
Abstract, JP 2001207145, "Hotmelt adhesive composition that contains EVA resin, tackifier resin, and wax, exhibits excellent basic adhesives properties like dry adhesion strength and thermal stability, and can be suitably applied for paper packaging", (Oct. 18, 2001).
Abstract, JP 48001823, "Coating composition for heat-sticking", (Jan. 20, 1973).
Abstract, JP 58047038, "Heat sealing resin compsn.—comprising ethylene-vinyl ester copolymers, low or non-crystalline ethylene-propylene or-butene-1 copolymer and tackifier", (Mar. 18, 1983).
Abstract, JP 51090342, "Improving softening pts. of hot melt compsn.—comprising copolymer of ethylene and vinyl acetate", (Aug. 7, 1976).
Abstract, Shekhar, A., "A model for hot tack behavior in ethylene acid copolymer films", E.I. DuPont De Nemours and Co., Inc., Orange, TX; Tappi J. (1994), 77(1), pp. 97-104.
Abstract, Foster, B.W., "What happens when you drool?", Eastman Chemical Company, Longview, TX., Polym., Laminations Coating Conference (1996), vol. 1, pp. 145-165; TAPPI Press, Atlanta, GA.
Abstract, Patel, R.M. et al., "Comparison of EVA and polyolefin plastomer as a blend component in various films applications", Polyolefins Research, The Dow Chemical Company, Freeport, TX; Polym., Laminations, Coat. Conf. (1997), vol. 1, pp. 239-242, (TAPPI Press, Atlanta, GA.)
Abstract, Sierra, J.D. et al., "Effect of metallocene Polyethylene on heat sealing properties of low density polyethylene blends", Instituto de Capacitaticion e Investigacion del Plastico y del Caucho, Colombia, USA; Annu. Tech. Conf.—Soc. Plast. Eng (1999), 57th (vol. 2), pp. 2056-2060.
Abstract, Campbell, R.N., "Polypropylene film comparisons from sequential and simultaneous tenter BOPP processes", UNIPOL PP Division, Union Carbide Corporation, Houston, TX; TAPPI Polym., Laminatios Coat. Conf. (1999), vol. 2, pp. 753-767, (TAPPI Press, Atlanta, GA.)

Abstract, Vansant, J.D., "The effect of coextrusion on the hot-tack performance of a common ionomer resin", Chestnut Run Laboratories Packaging & Industrial Polymers, DuPont Company, Wilmington, DE; Polym., Laminations Coat. Conf. (1998), vol. 2, pp. 743-754 (TAPPI Press, Atlanta, GA.)

de Garavilla, J.R., "Ionomer, acid copolymer, and metallocene polyethylene resins: A comparative assessment of sealant performance", vol. 78, No. 6, Tappi Journal, pp. 191-203 (Jun. 1995).

Duncan et al., "EVA and VAE Copolymers for Hot Melt PSA's", Adhesives Age, (Mar. 1980), pp. 37-41.

McDonald, J.W., et al., "Factors Affecting Hot Tack in Hot Melt Systems Containing Ethylene Interpolymers", Tappi Journal, vol. 51, No. 7, pp. 46A-50A (Jul. 1968).

Rapra Abstract, "Eastman Builds in Polyolefins; Plans entry into LLDPE, HDPE Lists", Modern Plastics International 19, No. 9, (Sep. 1989), pp. 32-36.

Schmidt, et al., "Coatings & Laminates of Improved Ethylene Alkyl Acrylate Copolymer With Polypropylene and Polyester", TAPPI Proceedings, 1997 Polymers, Laminations & Coatings Conference, vol. 2, pp. 397-415.

Wooster, J.J., "New Resins for Fresh-Cut Produce Packaging", Journal of Plastic Film & Sheeting, vol. 14, (Jan. 1998), pp. 76-89.

Rapra Abstract, "Hydrogenated Tackifiers", Modern Plastics International 27, No. 8, (Aug. 1997), pp. 122.

Abstract for JP58-47038 (Mar. 18, 1983).

Abstract for JP51114480 (Oct. 8, 1976).

Rapra Abstract, "Elvax 40 and 150 high vinyl acetate resins . . . specialty blending resins for adhesives, sealants and coatings", Du Pont de Nemours International SA, Geneva, c. 1989, pp. 8 (Feb. 28, 1989).

* cited by examiner

Figure 1
Film performance on car painted bonnet/hood surface

Figure 2
Film performance on car painted bonnet/hood surface Before test:

Film 5                    Film 9

Film 8                    Film 7

After test:

Film 5                    Film 9

Film 8                    Film 7

Figure 3

Figure 4
Film performance on car painted bumper/fender surface

Film 5 and Film 9        Film 7 and 8

Before test:

Film 5 and Film 9        Film 7 and 8

After test:

PROTECTIVE FILMS

This application is a National Stage Application of International Application No. PCT/US02/33487, filed Oct. 22, 2002, which claims priority to GB 0125319.4, filed Oct. 22, 2001.

The present invention relates to protective films and in particular to protective films that can be used to protect the surfaces of smooth articles such as glass or other transparent materials, electrical goods, displays and especially automobiles particularly during transportation and storage.

Thermoplastic films which may be applied to the automobile body for protection during transportation from manufacture to point of sale and during storage are known. In some instances, wax coatings are used. Where thermoplastic films are used, the film typically comprises a multi layer film comprising an adhering layer and a protective backing layer. The adhering layer ensures that the film will stick to an article such as an automobile under transportation and storage conditions; the protective backing layer provides the bulk of the protection and easy handling of the film when applied to the surface.

An additional requirement of the adhering layer is that the film can be readily removed from the surfaces and that removal leaves no residues.

The film must also have good strength and puncture resistance and be as thin as possible. Furthermore, the materials from which the films are made must be such that economic manufacturing techniques such as blown and cast films, either mono- or co-extrusion, which requires adequate melt strength, may be employed.

Increasingly automobiles are made from a variety of materials. Furthermore, different finishes, particularly paints, are used with different materials. For example, an automobile may contain metal body panels, rubber sealants and plastic components, such as bumpers. Metal panels are typically painted with solvent-based paint systems and plastic components with water-based paint systems. The adhesive properties of the surfaces of these materials and the paints that are used thereon differ. Accordingly, there is a need for protective films which have adequate adhesion to the various surfaces without leaving undesirable deposits on any of the surfaces after removal.

Protective films currently used consist of a polyolefin, usually polyethylene or polypropylene as backing layer and an adhering layer consisting of polyethylene or an ethylene vinyl acetate copolymer containing polyisobutylene. Whilst these films have adequate adhesion to the automobile, they cannot be removed from the automobile without leaving undesirable deposits on the surface.

A further requirement for protective films is that they may be applied at room temperature and the necessary adhesion to the surface be achieved simply by pressing the film against the surface to be protected. It will be apparent that the need to, for instance, heat the film to achieve adequate adhesion will be inconvenient when applying film to complex three-dimensional articles such as automobiles. Although films in which the adhering layer contains polyisobutylene as an adhesion enhancer can be applied at room temperature, these films tend to leave residues on the car surface when they are removed. This is thought to be due to the migration of the polyisobutylene within the polymer film.

It has been proposed in PCT Publication WO 91/06609, French Certificate of Utility 2600981, European Patent 281694 and European Patent 592913 that laminar films comprising a polyolefin backing layer and an ethylene, unsaturated ester copolymer, particularly an ethylene vinyl acetate copolymer layer as the adhering layer may be used as protective films. We have found, however, that if the vinyl acetate content of the adhering layer is sufficiently high to provide the required adhesion, the film is too weak, blocks too much, cannot be readily extruded and sticks on the reel. Furthermore, the protective films of these patents need to be applied under heat to ensure adequate adhesion.

It has been proposed in Japanese Patent publication 54-160482 that a laminated film consisting of a polyethylene base layer having a thickness up to 18 µm and an ethylene base copolymer layer having a thickness of at least 10 µm may be used to protect metal sheets such as aluminium sheets and stainless steels sheets. A petroleum resin may be incorporated in the ethylene vinyl acetate copolymer adhesive layer and an example shows an ethylene vinyl acetate copolymer layer containing 2 parts by weight of a petroleum resin. The film is used for the protection of aluminium to which it is laminated at 70° C. GB 2277479 is concerned with protective films particularly for plastic sheeting which is subsequently moulded comprising a laminated film consisting of a polyethylene base layer and an ethylene vinyl acetate copolymer adhering layer which may contain an adhesion enhancing resin.

U.S. Pat. No. 5,154,981 is primarily concerned with stretch cling films and is concerned with the multilayer films comprising a cling layer of an ethylene unsaturated ester copolymer containing a tackifier and a polyolefin backing layer. The unsaturated ester is preferably methyl acrylate although vinyl acetate may be used. When a hydrocarbon resin tackifier is used it should have a softening point from 10° C. to 25° C. Although U.S. Pat. No. 5,154,981 states that its films may be used for surface protection applications, the use of a hydrocarbon resin tackifier of such a low softening point renders the film too soft for ready processing and effective surface protection.

Japanese Patent Publication JP 04239081 is concerned with films for the protection of chemically coloured stainless steel. The films are laminar films which may consist of a polyolefin backing layer and a polyolefin or ethylene vinyl acetate copolymer adhering layer. The ethylene vinyl acetate copolymer layer may contain a hydrocarbon resin. In Example 3, which relates to such a film, the ethylene vinyl acetate copolymer contains 6% vinyl acetate. The films are thick and are applied using heat to obtain the desired adhesion.

None of the films of these patents have been commercially successful for the protection of automobiles during transport. Accordingly, there remains a need for a film, which is easily manufactured, preferably by blown or cast co-extrusion, can be reeled and unreeled, which can be applied at room temperature and which achieves sufficient adhesion to all types of surfaces. The film and its adhesion to the surface must be able to withstand the storage and transportation conditions to which it may be subjected. The film must have adequate strength, stiffness and puncture resistance, and the film must be able to be removed from the various types of surfaces without leaving undesirable deposits on the protected surface.

The present invention provides such a film.

SUMMARY OF THE INVENTION

The present invention relates to protective films and in particular to protective films that can be used to protect the surfaces of smooth articles such as glass or other transparent

DETAILED DESCRIPTION

The invention further provides a protective film comprising a polyolefin backing layer and a co-extruded ethylene polymer or copolymer adhering layer containing from 2 to 40 wt %, preferably from 2 to 30 wt %, preferably from 3 to 30 wt %, more preferably from 4 to 20 wt % and most preferably from 5 to 15 wt % of a resin of softening point above 40° C., preferably above 50° C., more preferably above 60° C., the co-extruded ethylene polymer or copolymer having a vicat softening point below 90° C.

The multilayer film preferably has a total a thickness of less than 60 µm, preferably less than 55 µm, more preferably less than 50 µm, more preferably less than 45 µm, more preferably less than 40 µm, more preferably less than 35 µm more preferably less than 30 µm, more preferably less than 25 µm more preferably less than 20 µm, a tensile strength at break (as measured by ASTM D 882 of greater than 15 MPa, preferably more than 20 MPa, more preferably more than 25 MPa and a modulus of greater than 120 MPa, preferably greater than 150 MPa, optionally greater than 170 MPa, most preferably in the range 130 to 170 MPa.

The invention further provides the use as a protective film for automobiles of a film comprising a polyolefin backing layer and a co-extruded ethylene polymer or copolymer adhering layer containing from 2 to 30 wt %, preferably from 3 to 20 wt %, more preferably from 4 to 15 wt % of a resin of softening point above 40° C., preferably above 50° C., more preferably above 60° C. The softening point (° C.) of hydrocarbon resins is measured by the Ring and Ball Softening Point method according to ASTM E-28 (Revision 1996).

When the film is used for the protection of automobiles it is preferred that the film has a peel strength (as measured by D 5458) from both a water-based surface coating and a solvent-based surface coating of at least 150, preferably at least 300, more preferably at least 500, most preferably at least 600 cN per 25 mm.

In these films the choice of the polymers for the layers and the nature of the resin may be varied according to the preferred film properties. The backing layer of the multilayer film comprises a polyolefin and provides the bulk of the protection with the adhering layer of ethylene polymer or copolymer containing the hydrocarbon resin providing the adhesion to the surface to be protected.

The polymer or polymers chosen for the backing layer should provide adequate melt strength so that the multiply films may be produced by blown co-extrusion, cast co-extrusion, or any other suitable process. The backing layer is an ethylene or propylene polymer or copolymer and needs to have sufficient melt strength to enable laminar films to be produced by either blown film or casting processes. Where the laminar film is to be produced by blown film co-extrusion the ethylene or propylene polymer or copolymer should have a melt index as measured by ASTM D1238 of 0.1 to 10; preferably 1 to 7, where the film is to be produced by cast co-extrusion a melt index of 2 to 12 is preferred, more preferably 4 to 15, most preferably 5 to 12. The backing layer should be of low crystallinity, and when it is a polymer of ethylene, it may be an ethylene homopolymer or a copolymer of ethylene with other alpha olefins such as up to 30 wt % of a $C_3$ to $C_{10}$ alpha olefin. The backing layer also provides the bulk of the strength and puncture resistance of the laminar films and is therefore preferably of a density of 0.915 to 0.964 $g/cm^3$. Ethylene polymers or copolymers prepared using metallocene catalysts are preferred. The backing layer may itself be a multi-layer structure in which one of the layers is derived from an-ethylene polymer or copolymer obtained by metallocene catalysis.

The polyolefin backing layer is preferably an ethylene or propylene homopolymer or copolymer, ethylene polymers or copolymers being preferred because of their greater adhesion during co-extrusion. The density and melt index of the polyolefin, preferably polyethylene, backing layer is chosen to provide the desired strength (tensile strength), stiffness (modulus) and puncture resistance as well as the necessary melt strength when blown co-extrusion and casting is used for film production. It may be preferred to employ films containing two or more backing layers in which one type of polyolefin is used to provide a layer having a desired property such as tensile strength and/or modulus and another type of polyolefin is used to provide another desired property such as melt strength. For example, a low-density polyethylene layer may be used to provide stiffness and melt strength whereas a layer of polymer obtained by metallocene catalysis may be used to provide enhanced tensile strength and puncture resistance at low thickness.

The backing layer may contain additives such as stabilisers, antioxidants, anti-block and slip additives. Where the films are to be used for the protection of goods such as automobiles which can be parked for extended periods out of doors it is preferred that the backing layer contain a stabiliser to protect against degradation by ultra violet light such as from extended exposure to sunlight. Pigments can be added, and the films may be opaque, transparent, glossy or matt. The films may be cavitated by any of the known processes. The backing layer may also contain a resin such as a petroleum hydrocarbon resin, polyterpene resin, or a rosin ester to impart stiffness to the film, where such a resin is present it is preferred that it be present from 5 to 20% by weight and have a softening point of from 80° C. to 160° C., preferably from 85° C. to 150° C., more preferably from 90° C. to 140° C., more preferably from 95° C. to 140° C., most preferably from 100° C. to 140° C. Suitable resins would include those marketed by ExxonMobil Chemical® under the designation "EMPR" (ExxonMobil Polymer Resin). Examples of the EMPR-series of resins are EMPR-100, 101, 102, 103, 104, 112, 113, 114, 124. Other resins could include hydrogenated and partially hydrogenated C9 resins such as the Arkon® P and M-series from Arakawa Chemical Company, the Regalite® R and S-series from Eastman Chemical Company, Rosin Esters such as the Sylvalite® series, Terpene-based resins such as the Sylvares® series from Arizona Chemical Company and other resins within the ranges claimed herein.

The preferred thickness of the various layers depends upon the processing ability of the polymers and the desired properties. Typically the adhering layer has a thickness of from 5 to 30 µm, preferably from 10 to 25 µm, more preferably from 10 to 20 µm and the backing layer or layers a thickness of from 10 to 50 µm, preferably between 15 to 40 µm, more preferably between 20 to 40 µm with the overall thickness of the protective film being no more than 60 µm, preferably no more than 50 µm, more preferably no more than 40 µm and no thinner than 25 µm. A preferred film consists of a three layer film comprising an adhering layer of thickness at least 10 µm preferably from 10 µm to 20 µm, an intermediate layer and a backing layer both of thickness between 15 and 30 µm.

The adhering layer is co-extruded with the protective backing layer either by casting or blown film technology.

It is also preferred that the adhering layer have a melting point (as measured by ASTM D 3418) below 100° C. and preferably in the range 60° C. to 100° C., preferably 70° C. to 95° C., more preferably 70° C. to 90° C. Most preferred are the ethylene polymers and copolymers having a combination of melting point and vicat softening point disclosed herein.

The adhering layer may contain stabilisers, anti-oxidants etc. so as to improve resistance to processing and/or environmental degradation. The film may contain conventional pigments and colorants such as titanium dioxide. Calcium carbonate can also be used.

The adhering layer may be of an ethylene homopolymer or copolymer. Where it is a copolymer, it may be a copolymer of ethylene and another $C_3$ to $C_{10}$ alpha olefin. Alternatively, it may be a copolymer of ethylene and an unsaturated ester. The ethylene unsaturated esters are preferred, and we prefer that the ester contain 10 to 40 wt %, preferably from 12 to 30 wt %, more preferably from 15 to 20 wt % of the unsaturated ester. For blown film operations the most preferable range is 10 wt % to 20 wt % of the unsaturated ester and for cast film operations this can be extended to 10 wt % to 30% wt % of the unsaturated ester. We have also found that providing the ethylene unsaturated ester copolymer contains from 10 to 30 wt % of the ester and has a melt index of from 0.1 to 15, preferably from 1 to 10 and more preferably between 1.5 and 3 it can be co-extruded with the backing layer without any undesirable neck-in of the polymer in the melt in the cast process or a loss of melt strength in the blown film process. The adhering layer preferably has a vicat softening point as measured by ASTM D1525 of below 90° C., preferably 40° C. to 85° C., especially 60° C. to 80° C.

When an ethylene unsaturated ester copolymer is used the unsaturated ester may be vinyl acetate, vinyl propionate, higher esters, $C_1$-$C_8$ acrylates, $C_1$-$C_8$ methacrylates alone or in combination. Preferred are vinyl acetate and methyl acrylate, the latter providing thermal stability. The ester content is preferably for 12 to 20 wt % and the melt index of the unsaturated ester copolymer is preferably no greater than 25, preferably no greater than 20, even more preferably no more than 15. The ethylene unsaturated ester copolymer may be made by solution polymerisation and/or high-pressure free radical process. The ester content is expressed as wt % in relation to vinyl acetate, the weight range should be adjusted on a molar basis as esters of different molecular weight are used.

Examples of commercially available ethylene vinyl acetate copolymers that may be used in the present invention include the evatane EVA copolymers supplied by Atofina, Lotryl EMA supplied by Atofina, Lotryl EMA supplied by AtofinaGreenlfex, EVA supplied by Polimeri Europe, Alcudia-PA supplied by Repsol, DuPont Elvax EVA, Escorene Ultra supplied by ExxonMobil Chemical.

Alternatively the adhering layer may be low density polyethylene ('LDPE') which includes both low and medium density polyethylene having densities of 0.910 to 0.940 g/cm$^3$. Low density polyethylene includes copolymers and terpolymers of ethylene. Comonomers typically include $C_3$-$C_{10}$-alpha-olefins. The ethylene content will typically be at least 80 wt % of the polyethylene co-and terpolymers. These polymers and copolymers are typically prepared by metallocene catalysed coordination polymerisation in accordance with processes well known in the polymers art. Low density polyethylenes with densities of 0.940 g/cm$^3$ and lower are particularly suitable for the production of the adhering layers in the films of the invention.

Examples of commercially available low density polyethylenes that may be used in this invention include Escorene LDPE from ExxonMobil Chemical, Stamylan LD from DSM, Polyethylene from Dow, LDPE from Borealis, Novex LDPE from BP, Riblene from Polimeri Euorpa, PE from Repsol Alcudia.

The high-pressure polymerisation may be effected in a conventional autoclave or tubular reactor. The polymerisation with metallocene catalysts gives a particular polymer structure depending upon the polymerisation conditions. The particular conditions are chosen having regard to the product required.

Linear low density polymers produced by metallocene catalysis (m-LLDPE) may be used to produce the backing layers of the invention. Typically, they are copolymers of ethylene with at least one alpha olefin having at least four carbon atoms e.g. 1-butene, 1-hexene, 1-octene etc. Typically, the metallocene homopolymers or copolymers are produced using mono- or bis-cyclopentadienyl transition metal catalysts in combination with an activator of alumoxane and/or a non-coordinating anion in solution, slurry, high-pressure, or gas phase. The catalyst system may be supported or unsupported and the cyclopentadienyl rings may be substituted or unsubstituted. Titanium, zirconium and hafnium are preferred transition metals. Several commercial products produced with such catalyst/activator combinations are commercially available from ExxonMobil Chemical Company under the tradenames EXCEED® and EXACT® or from Dow Chemical Company under the tradenames ENGAGE® and AFFINITY®.

The metallocene-produced copolymers described above preferably have a polydispersity less than 4 and a composition distribution breadth index (CDBI) of 50% or more, preferably above 60%, even more preferably above 70%. In one embodiment, the CDBI is above 80%, even more preferably above 90%, even more preferably above 95%. In one embodiment, the polyethylene copolymer has a CDBI between 60 and 85%, even more preferably between 65 and 85%.

Composition Distribution Breadth Index (CDBI) is a measure of the composition distribution of monomer within the polymer chains and is measured by the procedure described in PCT publication WO 93/03093, published 18 Feb. 1993 including that fractions having a weight average molecular weight (Mw) below 15000 are ignored when determining CDBI.

The process for producing m-LLDPE may be performed using metallocene catalysts such as those described and using a low pressure single or multiple reactor. The possible processes are: gas phase (slurry and solution) or combinations thereof. Preferably the m-LLDPE used in this invention has a density above 0.915 g/cm$^3$.

The resin that is incorporated into the ethylene polymer or copolymer adhering layer should be compatible with the ethylene polymer or copolymer from which the adhering layer is made so that there is little, if any, migration of the resin to the surface of the layer since this can leave deposits on the surface that has been protected after the film is removed. The resin may be selected from aliphatic hydrocarbon resins, at least partially hydrogenated aliphatic hydrocarbon resins, aliphatic/aromatic hydrocarbon resins, at least partially hydrogenated aliphatic aromatic hydrocarbon resins, cycloaliphatic hydrocarbon resins, at least partially hydrogenated cycloaliphatic resins, cycloaliphatic/aromatic hydrocarbon resins, at least partially hydrogenated cycloaliphatic/aromatic hydrocarbon resins, at least partially hydrogenated aromatic hydrocarbon resins, naturally occurring resins such as terpene resins, phenolic, terpene phenolic, rosin or rosin esters.

The softening point of the resin should be above 40° C., preferably between 40° C. and 130° C., more preferably between 60° C. and 130° C., preferably between 80° C. and 130° C., more preferably 80° C. and 120° C.

We prefer to use hydrocarbon petroleum resins or rosin esters. We prefer that the resin contain some aromaticity since this has been found to improve the compatibility with the ethylene unsaturated ester copolymer. An aromaticity of 5 to 40% as measured by $^1$H NMR is preferred.

The resins may be subjected to hydrogenation by conventional means to reduce reactivity, odour, colouration and improve colour stability. The resins may be partially hydrogenated or substantially hydrogenated.

As used herein at least partially hydrogenated means that the material contains less than 90% olefinic protons, more preferably less than 75% olefinic protons, more preferably less than 50% olefinic protons, more preferably less than 40% olefinic protons, more preferably less than 25% olefinic protons, more preferably less than 15% olefinic protons, more preferably less than 10% olefinic protons, more preferably less than 9% olefinic protons, more preferably less than 8% olefinic protons, more preferably less than 7% olefinic protons, and more preferably less than 6% olefinic protons. As used herein, substantially hydrogenated means that the material contains less than 5% olefinic protons, more preferably less than 4% olefinic protons, more preferably less than 3% olefinic protons, more preferably less than 2% olefinic protons, more preferably less than 1% olefinic protons, more preferably less than 0.5% olefinic protons, more preferably less than 0.1% olefinic protons, and more preferably less than 0.05% olefinic protons after hydrogenation. The degree of hydrogenation is typically conducted so as to minimize and preferably avoid hydrogenation of the aromatic bonds. The aromatic content of the resin may be adjusted to suit the polarity of the ethylene unsaturated ester copolymer.

Particularly preferred resins are those sold by ExxonMobil Chemical under the designation "EMPR" (ExxonMobil Polymer Resin) in particular EMPRs 100 to 125. The resins are chosen for maximum compatibility with the polymer, for example ahydrogenated aromatic-containing cyclopentadiene-based resin (EMPR 114) is especially useful with ethylene vinyl acetate copolymers. Alternatively, other resins described herein such as rosin esters and terpenic resins may be used. We have also found that partially hydrogenated $C_9$ petroleum resins are particular useful. Resins particularly suited for use as described herein include EMFR-series of resins (ExxonMobil Functional Resins) such as EMFR-100 and 101, available from ExxonMobil Chemical Company, hydrogenated and partially hydrogenated C9 resins such as the Arkon® P and M-series from Arakawa Chemical Company such as Arkon™ M90, M100, M115 and M135, the Regalite® R and S-series, Eastotac™ resins, Piccotac™ $C_5/C_9$ resins, and Regalrez™ aromatic from Eastman Chemical Company, Rosin Esters such as the Sylvalite® series, Terpene-based resins such as the Sylvares® series from Arizona Chemical Company, Sylvares™ phenol modified styrene-α methyl styrene resins, styrenated terpene resins, Zonatac terpend-aromatic resins, and terpene phenolic resins available from Arizona Chemical Company, Sylvatac™ and Sylvalite™ rosin esters available from Arizona Chemical Company, Norsolene™ aliphatic aromatic resins available from Cray Valley of France, Dertophene™ terpene phenolic resins available from DRT Chemical Company, Wingtack™ ET and EXTRA available from Goodyear Chemical Company, Foral™, Pentalyn™, AND Permalyn™ rosins and rosin esters available from Eastman Chemical Company, Quintone™ acid modified $C_5$ resins, $C_5/C_9$ resins, and acid modified $C_5/C_9$ resins available from Nippon Zeon of Japan, and LX™ mixed aromatic/cycloaliphatic resins available from Neville Chemical Company, Clearon hydrogenated terpene aromatic resins available from Yasuhara and other resins within the ranges claimed herein. The preceding examples are illustrative only and by no means limiting.

It is also preferred that the resin be incorporated into the adhering layer by means of a masterbatch which can be mixed with the ethylene polymer or copolymer which forms the adhering layer prior to co-extrusion, generally in the feed hopper of the extruder. The masterbatch consists of the resin and a polymer, generally an ethylene polymer or copolymer which is compatible with the ethylene polymer or copolymer used to make the adhering film. The masterbatch of the invention is typically from 20 to 70 wt % resin and from 80 to 30 wt % polymer, preferably from 20 to 60 wt % resin and from 80 to 40 wt % polymer, more preferably 30 to 60 wt % resin and 70 to 40 wt % polymer. When the adhering layer is to be made from an ethylene unsaturated ester copolymer it is preferred that the polymer in the masterbatch is also an ethylene unsaturated ester copolymer, preferably the same unsaturated ester. The ester content of the polymer used in the masterbatch may, however, be lower than that of the copolymer from which the adhering layer is made to enable easier handling of the masterbatch.

Accordingly in a further embodiment, the invention provides a masterbatch comprising from 20 to 70 wt % of a resin having a softening point above 40° C. and 80 to 30 wt % of an ethylene polymer or copolymer having a vicat softening point below 90° C.

Use of the masterbatch can enable better dispersion and compatibility of the polymer and the resin in the final film. The resins and ethylene polymers and copolymers which may be used to make the masterbatch are those described herein in relation to the adhering layer of the protective film. They may be different from the polymer to which the masterbatch is added. For example the resin may be combined with a polymer in the masterbatch and then the masterbatch may be added to a different polymer. The use of a masterbatch is often recommended to ensure good mixing of all the components. This is because the molecular weights, viscosities etc. of the resin and the polymer are very different and direct blending often results in poor mixing.

The films of the present invention may be cast films or films produced by blown co-extrusion. The latter is preferred. We have found that the use of an ethylene unsaturated ester copolymer particularly an ethylene vinyl acetate copolymer of melt index 0.1 to 20 containing 10 to 30 wt % vinyl acetate (e.g. preferably between 10 and 20 wt % for blown film) and containing between 3 and 15 wt % preferably from 5 to 10 wt % of resin together with a low density polyethylene backing layer can be readily co-extruded to produce a film of the desired properties.

We have found that these films may be applied to surfaces including both painted metal and bumper (fender) surfaces of automobiles to provide protection, e.g. during transport, by application to the surfaces at ambient temperatures (~20° C.). Such application results in sufficient adhesion between the ethylene unsaturated ester copolymer layer and the surfaces to withstand transport of the vehicle at normal transportation speeds and also at speeds as high as 130 kilometres/hr over periods consistent with vehicle transport. We have also found that the films may be removed from the different surfaces of the vehicle by, for example, peeling without damaging the surface finish and without leaving undesirable deposits on the surface.

Protection of other surfaces is also covered in this invention. Consumer goods such as displays, e.g. glass, plastic, liquid crystal displays etc., white goods, acrylic surfaces, e.g. plexiglass, or on anything that needs protection against damage, e.g. scratches, impacts, before use. The invention is however particularly useful in the protection of surfaces during transport.

The present invention is illustrated by the following examples.

In these examples the following polymers and hydrocarbon resins were used.

Polymers and Hydrocarbon Resins

A) A metallocene catalysed ethylene, octene copolymer plastomer of density 0.882, melt index 1 and having a melting point of 66.6° C. and a vicat softening point of 53.7° C., marketed by ExxonMobil Chemical as Exact 8201.

B) An ethylene vinyl acetate copolymer of melt index 3, containing 28 wt % vinyl acetate and having a melting point of 70° C. and a vicat softening point of 43° C., marketed by ExxonMobil Chemical as Escorene Ultra FL 00328.

C) An ethylene vinyl acetate copolymer of melt index 14, containing 18 wt % vinyl acetate and having a melting point of 82° C. and a vicat softening point of 52° C., marketed by ExxonMobil Chemical as Escorene Ultra FL 01418

D) A low density polyethylene of melt index 0.7 and density 0.923, and having a melting point of 110° C. and a vicat softening point of 96° C., marketed by ExxonMobil Chemical as ExxonMobil LD 150

E) A low density polyethylene of melt index 0.75 and density 0.9280 marketed by ExxonMobil Chemical as ExxonMobil LD 170

F) A hydrogenated cyclopentadiene resin marketed by ExxonMobil Chemical as EMPR 104 (Softening Point (SP) 125° C., Tg 75° C., Mn 360 amu)

G) A hydrogenated cyclopentadiene resin marketed by ExxonMobil Chemical as EMPR 114 (SP 118° C., Tg 68° C., Mn 330 amu)

H) An ethylene vinyl acetate copolymer of containing 18 wt % vinyl acetate of melt index 1.7, and having a melting point of 85.5° C. and a vicat softening point of 62° C. marketed by ExxonMobil Chemical as Escorene Ultra FL 00218

I) An ethylene vinyl acetate copolymer containing 28 wt % vinyl acetate of melt index 7 and a vicat softening point of 41.5° C. marketed by ExxonMobil Chemical as Escorene Ultra FL 00728

J) A low density polyethylene of melt index 3 and density 0.9335 marketed by ExxonMobil Chemical as ExxonMobil LD 151

K) A linear low density ethylene, hexene copolymer of melt index 2.5 and density 0.918 obtained by using metallocene catalysis, marketed by ExxonMobil Chemical as Exceed 2518 CB L) A metallocene catalysed ethylene, octene copolymers plastomer of density 0.882 melt index 3 marketed by ExxonMobil Chemical as Exact 8203.

M) A linear low density metallocene polymerised polyethylene of Melt Index 1 and density 0.918 marketed by ExxonMobil Chemical as Exceed 1018 CA.

EXAMPLE 1

In order to demonstrate the adhesive properties of films that can form the adhering layers of the films of the present invention, the monolayer films set out in Table 1 were produced on a laboratory Collin cast film extruder line from the formulations set out in Table 1 with the addition of conventional anti-oxidants. They were extruded at between 150° C. and 180° C. and a pressure of about 35 bar with a die gap of 0.6 mm an output of 3.5 kg/hr. The adhesive or adhering force when applied to steel plates coated with a solvent-based coating and a water-based coating was measured according to ASTM-D 5458 and is shown in Table 1. The adhesive or adhering force between the protective film and the coated surface was measured in cN at the moment when the 25 mm film specimen is separating from the incline at the horizontal cling line. This line is situated at 50% of the total distance.

TABLE 1

| Film | Polymer Formulation | Film thickness (μm) | Adhering force (cN/25 mm) on solvent-based painted steel plate | Adhering force (cN/25 mm) on water-based painted steel plate |
|---|---|---|---|---|
| 1 | H | 50 | 55 | — |
| 2 | C | 31 | 65 | 48 |
| 3 | 95% C + 5% F | 33 | 120 | 75 |
| 4 | 90% C + 10% F | 33 | 200 | 120 |
| 5 | 90% C + 10% G | 32 | 180 | 180 |

Films 2 to 5 were tested in a vehicle-driving test. The films were applied after thorough cleaning of the application areas (the bonnet/hood and top/front bumper/fender). They were applied by hand from a wound roll and smoothed by light brushing. The bonnet temperature was approximately 23° C. and the bumper temperature was approximately 18° C. The test involved driving at 40 to 70 km/hr for 8 km, 120 km/hr for 2.5 km, stopping and repeating the procedure in the reverse order.

Figure 1:
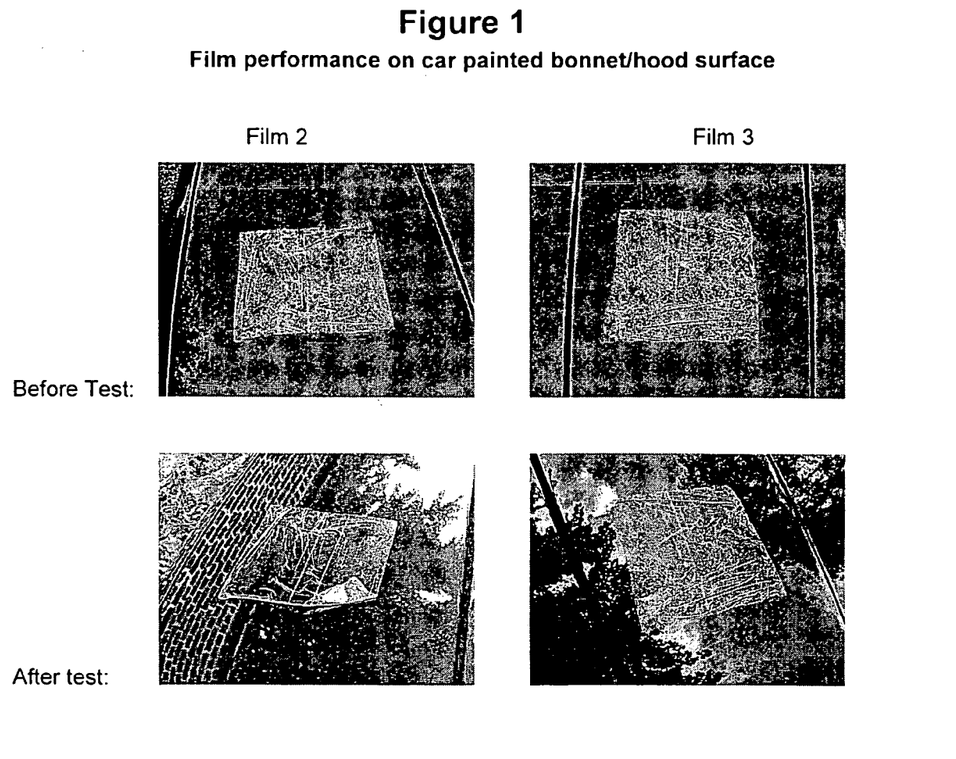
FIG. 1 shows the film performances on the painted metal car bonnet/hood surface for films 2 and 3 of Example 1.

FIG. 1 shows the film performances on the painted metal car bonnet. As can be seen from FIG. 1 Film 2 (without the hydrocarbon resin) showed signs of peeling from the surface during the first half of the test and severe peeling at the end of the test. Films 3 (5% hydrocarbon resin) and films 4 and 5 (10% hydrocarbon resin) showed no signs of peeling after the complete test. The films were easily removed and no deposits were observed on the paint surfaces. Similar results were also observed on the painted thermoplastic bumper surface where Film 2 showed peeling similar to that on the bonnet surface. Films 3 and 4 showed no peeling at all.

EXAMPLE 2

Compounds of polymer H and polymer I were made with 10% resin G. A compound of resin G with polymer A was also made for comparison. All compounds were stabilised with conventional antioxidants.

All these compounds were co-extruded on a Collin extrusion line as cast films with polymer J and polymer K as backing layers. The nature of the backing layer and the adhering layer are set out in Table 2. The films were adhered to steel painted with a water-based acrylic paint. The adhering force to metal painted with a water-based acrylic paint, the 1% Secant modulus as measured by ASTM D 882, tensile strength as measured by ASTM 882 and elongation at break as measured by ASTM D 882 of the films were obtained and the results are included in Table 2.

EXAMPLE 3

In order to assess adhesion of potential adhering layer films 2 to 5 and films of two pure plastomers, polymers A (Film 11) and L (Film 12) were tested in a road test.

A. Experimental Road Test

Test Conditions:

The films were applied by hand on a warm 54° C., car body and the bumper of the car.

The car was driven for 10 minutes at 50-70 km/hr and for 10 minutes at 70-120 km/hr. The car was then stopped and the results recorded for ½ the way. The reverse journey was then performed, and the end results were recorded.

TABLE 2

| Film | Identification Backing Layer/s | Adhering layer | Total Film Thickness (μm) | Adhering force (cN) | 1% Secant Modulus (MPa) | Tensile at Break MD (MPa) | Elongation @ Break MD (%) |
|---|---|---|---|---|---|---|---|
| 6 | 26 μm polymer J | 11 μm 90% polymer H + 10% resin G | 39 | 80 | 209 +/− 10 | 34.4 +/− 2.4 | 352 +/− 33 |
| 7 | 27 μm polymer J | 12 μm 90% polymer A + 10% resin G | 39 | 160 | 182 +/− 7 | 26.0 +/− 2.2 | 358 +/− 37 |
| 8 | 26 μm polymer J | 14 μm 90% polymer I + 10% resin G | 40 | 550 | 174 +/− 14 | 26.0 +/− 1.8 | 337 +/− 31 |
| 9 | Intermediate layer: 19 μm polymer D, backing layer: 11 μm 90% polymer K + 10% polymer J | 14 μm 90% polymer I + 10% resin G | 44 | 625 | 155 +/− 2 | 27.8 +/− 1.6 | 451 +/− 28 |
| 10 | 26 μm polymer J | 14 μm polymer I | 40 | 200 | 182 +/− 7 | 30.4 +/− 2.3 | 386 +/− 41 |

MD = Machine Direction

Addition of the hydrocarbon resins according to the present invention therefore increases the adhesive or adhering force to these smooth surfaces. Films 8 and 9 employing polymer I containing 10% resin G as adhesive layer showed the highest adhering force.

Films 5, 7, 8 and 9 were tested on an automobile in a field test. The films were applied to the bonnet of one car and the bumper of another. The driving protocol was the same as in Example 1. The ambient temperature was 18° C. throughout the test. No signs of peeling were seen for any of the films containing the hydrocarbon resins on either bonnet or bumper tests.

Figure 2:
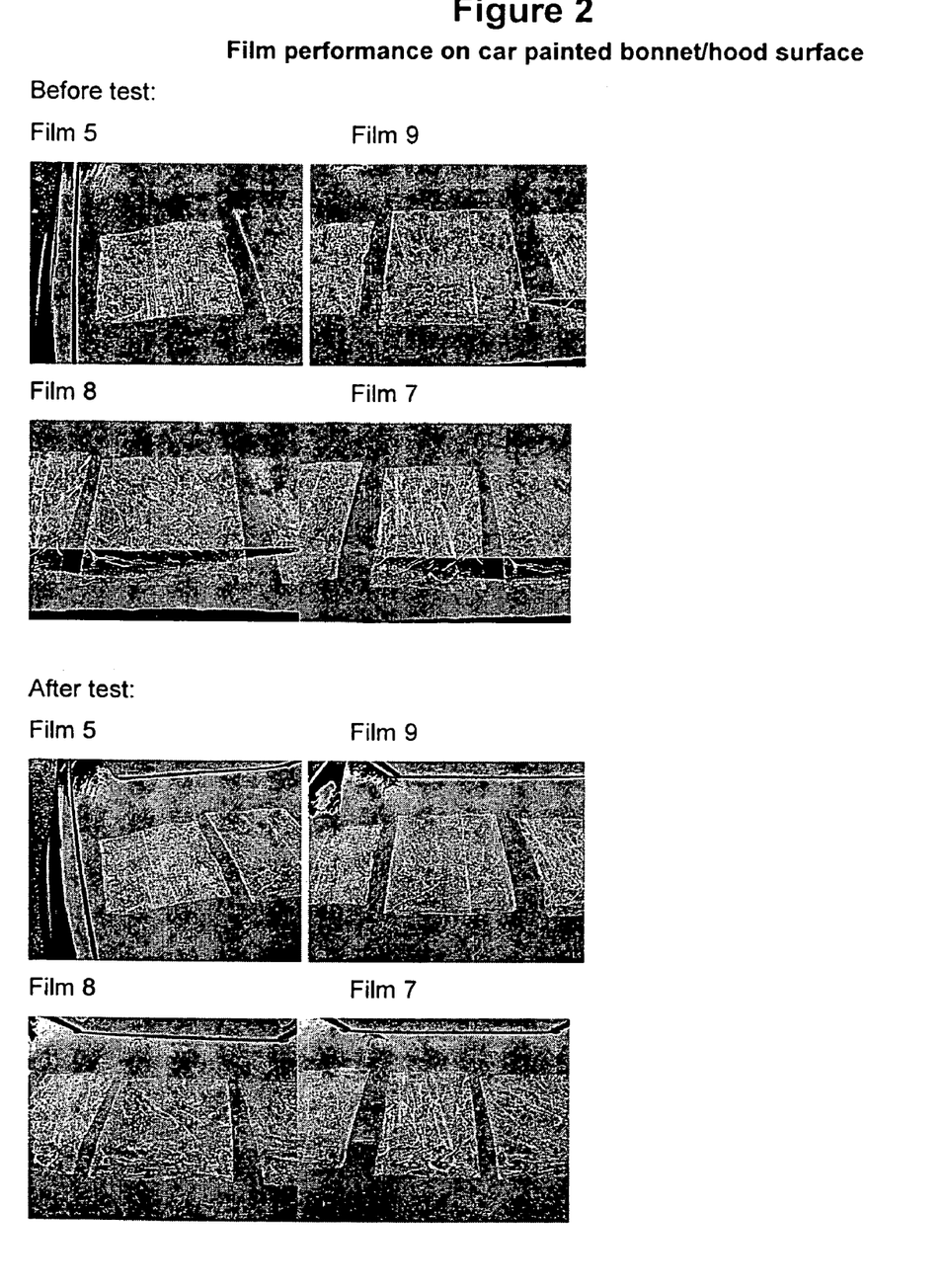
FIG. 2 shows the tests on the bonnet from Example 2.
Figure 3:
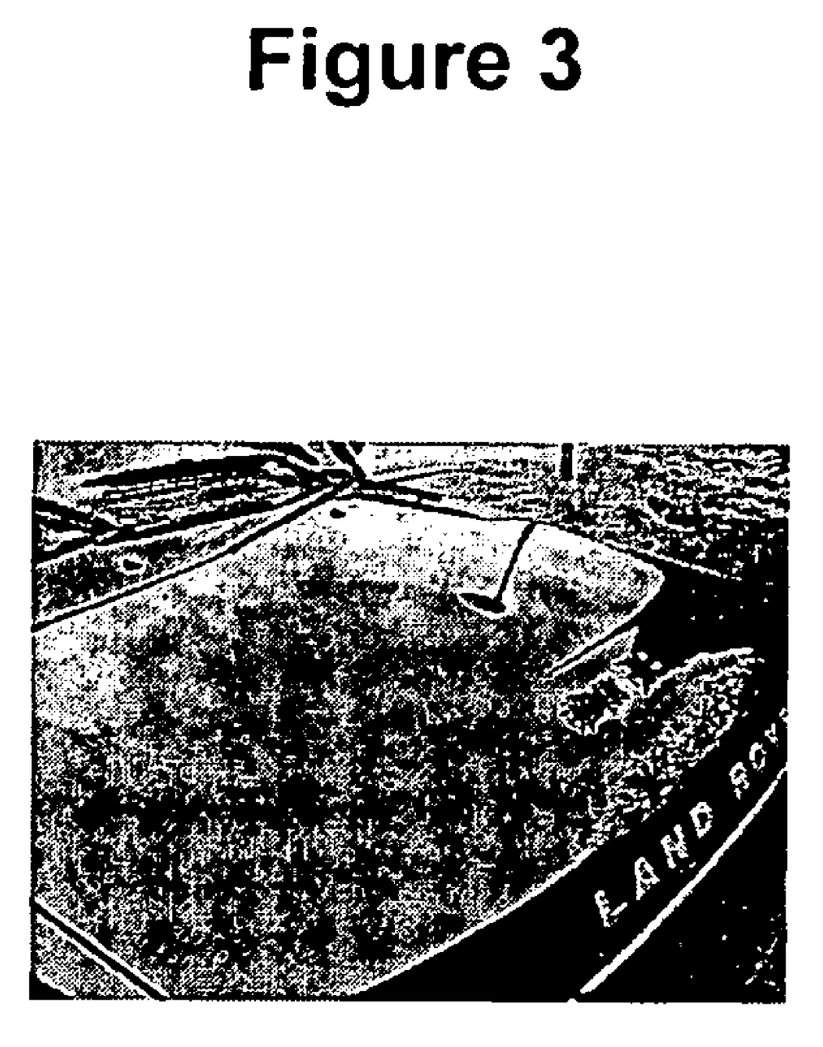
FIG. 3 shows no residue on the automobile after removing the film from the bonnet in Example 2.
Figure 4:
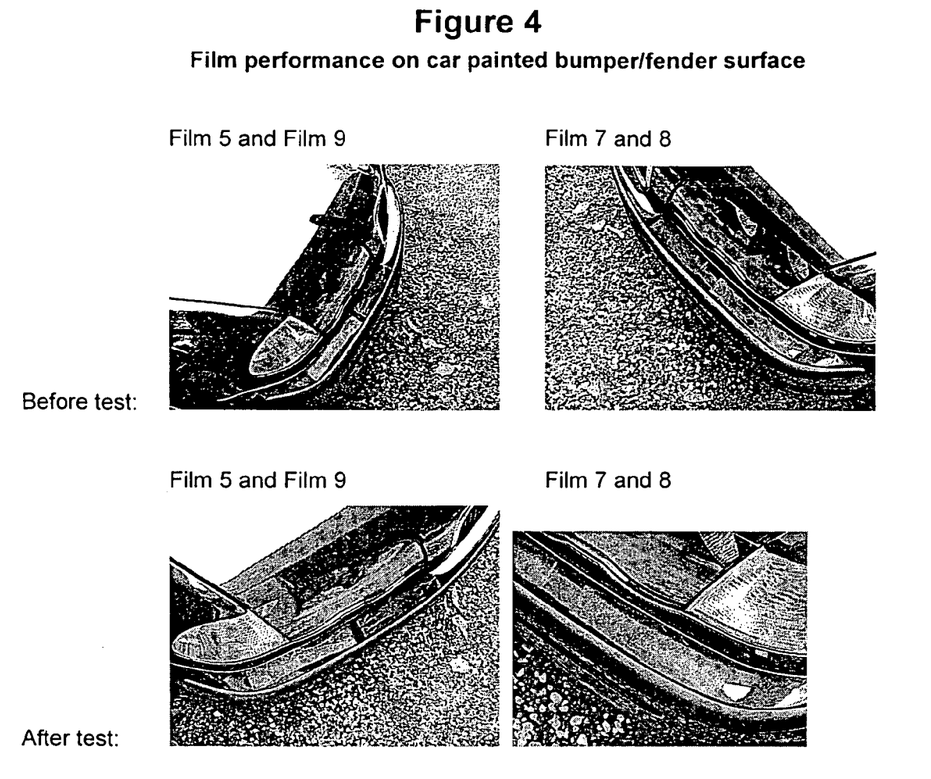
FIG. 4 shows the tests on the bumper from Example 2.

Furthermore, as observed in FIG. 3, no residue was seen on the automobile after removing the film from the bonnet. The tests on the bonnet are shown in FIG. 2 and the tests on the bumper in FIG. 4. The films were left on the bumper for a further 7 days during which the vehicle travelled at local urban speeds of between 50 and 100 km/hr. Films 5, 7 and 9 were removed, leaving no residue. Then the vehicle was driven for over 800 km at speeds of up to 130 km/hr for several hours. The weather conditions were variable involving cloud, heavy rain and high winds and the temperature varied between 11 to 15° C. Film 8 remained on the bumper and was removed after the travel (or 10 days) after application to the car, leaving no residue.

Test Results:

Car Body

| | | Start | 1/2 way | End | Conclusion |
|---|---|---|---|---|---|
| Film | 2 | Satisfactory adhesion | partial removal | partial removal | unsatisfactory |
| Film | 3 | Satisfactory adhesion | no removal | no removal | satisfactory |
| Film | 11 | Satisfactory adhesion | partial removal | total removal | unsatisfactory |
| Film | 12 | Satisfactory adhesion | partial removal | total removal | unsatisfactory |

Bumper

| | | Start | 1/2 way | End | Conclusion |
|---|---|---|---|---|---|
| Film | 2 | Satisfactory adhesion | partial removal | partial removal | unsatisfactory |
| Film | 3 | Satisfactory adhesion | no removal | no removal | satisfactory |
| Film | 4 | Satisfactory adhesion | no removal | no removal | satisfactory |
| Film | 11 | Satisfactory adhesion | partial removal | total removal | unsatisfactory |
| Film | 12 | Satisfactory adhesion | partial removal | partial removal | unsatisfactory |

B. Lab Testing

To simulate the adherence of the film on the car and on a bumper, a lab test was set up on a Zwick tensile testing apparatus. In this test, the film is pressed against two different steel plates one of which is coated with a water-based coating and the other is coated with a solvent based coating.

The plates are fixed at an angle of 45 degrees on a sledge (wedge) and the film is peeled off from the plates at a speed of 100 mm/min, following ASTM D 5458.

The adhering force, in cN, to separate the film from the incline at the horizontal cling line, situated at 50% of the plate at a distance of 5 cm. Also the force at the 100% distance of the plate is measured (10 cm). This value is indicative of the film performance. The results are set out in Table 3. The films containing the hydrocarbon resins all achieved higher adhering forces than the control film(s) containing no hydrocarbon resin. The best adherence was delivered by films comprising resin G.

TABLE 3

| | | Solvent based coating | | Water based coating | |
|---|---|---|---|---|---|
| Film | Thickness | Adhering force (cN) At 50% distance | Adhering Force (cN) At 100% distance | Adhering force (cN) At 50% distance | Adhering force (cN) At 100% distance |
| 2 | 31 | 65 | 105.3 +/− 14 | 48 | 66.4 +/− 4 |
| 3 | 33 | 120 | 180.0 +/− 33 | 75 | 146.3 +/− 28 |
| 4 | 33 | 200 | 285.6 +/− 63 | 120 | 194 +/− 16 |
| 5 | 32 | 180 | 323.8 +/− 63 | 180 | 287.2 +/− 48 |

EXAMPLE 4

In order to assess both adhesion and mechanical properties of films of the present invention, the following films were produced by cast co-extrusion using the following as the adhering layer:

Polymer H plus antioxidant plus 10% Resin G
Polymer I plus antioxidant plus 10% Resin G
Polymer A plus antioxidant plus 10% Resin G

TABLE 4

| Film | Backing layer | Intermediate layer | Adhering layer |
|---|---|---|---|
| 13 | 8 μm 90% polymer K 10% polymer J | 22 μm polymer J | 14 μm 90% polymer H 10% resin G |
| 6 | 26 μm polymer J | | 11 μm 90% polymer H 10% resin G |
| 14 | 23 μm polymer J | | 18 μm 90% polymer H 10% resin G |
| 9 | 11 μm 90% polymer K 10% polymer J | 19 μm polymer J | 14 μm 90% polymer I 10% resin G |
| 8 | 26 μm polymer J | | 14 μm 90% polymer I 10% resin G |
| 10 | 26 μm polymer J | | 14 μm polymer I |
| 15 | 27 μm polymer J | | 12 μm 90% polymer A 10% resin G |
| 16 | 27 μm polymer J | | 12 μm polymer A |

The properties of these films were measured on the Zwick tensile apparatus and found to be as shown in Table 5.

TABLE 5

| Film | Thickness (μm) | 1% Sec Modulus in MD (MPa) | Tensile @ Break in MD (MPa) | Elongation @ Break in MD (%) |
|---|---|---|---|---|
| 6 | 39 | 209 +/− 10 MPa | 34.4 +/− 2.4 MPa | 352 +/− 33% |
| 8 | 40 | 174 +/− 14 MPa | 26.0 +/− 1.8 MPa | 337 +/− 31% |
| 9 | 43 | 155 +/− 2 MPa | 27.8 +/− 1.6 MPa | 451 +/− 28% |
| 10 | 42 | 182 +/− 7 MPa | 30.4 +/− 2.3 MPa | 386 +/− 41% |
| 11 | 40 | 182 +/− 7 MPa | 26.0 +/− 2.2 MPa | 358 +/− 37% |

The films were adhered to water-based acrylic-coated steel. The adhering force of various film was measured on steel coated with a water based acrylic coating by peeling at 100 mm/minute and found to be as shown in Table 6. The adhering force was measured immediately after application, 24 hours after application and in the case of film 6 48 hours after application.

TABLE 6

| Film | Thickness (μm) | Adhering force (cN) At 50% distance | Adhering force (cN) At full distance |
|---|---|---|---|
| 8 | 40 | 525 | 787 +/− 132 |
| 9 | 44 | 525 | 735 +/− 47 |
| 10 | 40 | 100 | 157 +/− 42 |
| 11 | 39 | 140 | 219 +/− 26 |
| 16 | 39 | 80 | 102 +/− 7 |
| After 24 hr | | | |
| 8 | 40 | 550 | 778 +/− 160 |
| 9 | 44 | 625 | 910 +/− 50 |
| 10 | 40 | 200 | 240 +/− 13 |
| 11 | 39 | 160 | 277.6 +/− 58 |
| 16 | 39 | 80 | 120 +/− 12 |
| After 48 Hr | | | |
| 9 | 38 | 55 | 90.4 +/− 18 |
| Reference: | | | |
| 5 | 32 | 340 | 455 +/− |

Table 6 illustrates that modifying the adhering layer with resin G improves the adhering force over the control film, which does not contain hydrocarbon resin.

COMPARATIVE EXAMPLE 6

Two resin free co-extruded films were blown to provide the following films:

Film 17: Polymer A (12 μm) (as the adhering layer)/90% polymer M 10% of polymer D (28 μm)

Film 18: Polymer B (12 μm) (as the adhering layer)/90% polymer M containing 10% of polymer D and polymer E (32 μm)

The films were applied to automobiles and tested in a field test: at 40/50 km/hr both films adhered satisfactorily to the car, however at 70 km/hr both films were blown off the car, especially from the bumper.

The invention claimed is:

1. A multilayer, peelable, protective film comprising an adhering layer and at least one co-extruded backing layer wherein the backing layer comprises a polyolefin selected from the group consisting of ethylene homopolymers, propylene homopolymers, ethylene copolymers, and propylene copolymers, and the adhering layer is 5 to 30 microns thick and comprises (i) an EVA copolymer comprising ethylene and from 2 to 40 wt % of vinyl acetate and having a vicat softening point of 40-90° C., and (ii) 2 to 40 wt % of a resin having a softening point above 40° C., where the film has a peel strength from both a water-based surface coating and a solvent-based surface coating of at least 150 cN per 25 mm.

2. A multilayer protective film according to claim 1 wherein the adhering layer contains 2 to 30 wt % of the resin.

3. A multilayer protective film according to claim 1 wherein the EVA copolymer of the adhering layer has a vicat softening point of 40-85° C.

4. A multilayer protective film according to claim 1 wherein the adhering layer has a melting point below 100° C.

5. A multilayer protective film according to claim 4 wherein adhering layer has a melting point of 65-100° C.

6. A multilayer protective film according to claim 1 wherein the film is produced by blown co-extrusion.

7. A multilayer protective film according to claim 6 wherein the backing layer is derived from a polymer of melt index 0.1 to 10.

8. A multilayer protective film according to claim 1 wherein the film is produced by cast co-extrusion.

9. A multilayer protective film according to claim 8 wherein the backing layer is derived from a polymer of melt index 2 to 12.

10. A multilayer protective film according to claim 1 wherein the backing layer is derived from a polymer or copolymer of ethylene of density from 0.915 to 0.964.

11. A multilayer protective film according to claim 1 wherein the backing layer is derived from a polyolefin produced by metallocene catalysed polymerisation.

12. A multilayer protective film according to claim 1 wherein the EVA copolymer contains from 2 to 30 wt % vinyl acetate.

13. A multilayer protective film according to claim 1 having an overall thickness of less than 60 μm.

14. A multilayer protective film according to claim 1 having a tensile strength at break of greater than 15 mPa.

15. A multilayer protective film according to claim 1 having a modulus greater than 120 mPa.

16. A multilayer protective film according to claim 1 wherein the adhering layer has a thickness of from 5 to 30 μm.

17. A multilayer protective film according to claim 1 wherein the backing layer or layers have a thickness of from 10 to 50 μm.

18. A multilayer protective film according to claim 1 wherein the resin comprises an at least partially hydrogenated aromatic-containing cyclopentadiene resin.

19. The multilayer protective film according to claim 1 wherein the EVA copolymer contains from 18 to 30 wt % vinyl acetate.

20. The multilayer protective film according to claim 1 wherein the EVA copolymer contains from 28 to 30 wt % vinyl acetate.

21. The multilayer protective film according to claim 1 wherein the film has a peel strength (as measured by D 5458) from both a water-based surface coating and a solvent-based surface coating of at least 300 cN per 25 mm.

22. The multilayer protective film according to claim 1 wherein the film comprises an adhering layer of at least 10 micron thickness, an intermediated layer of 15 to 30 micron thickness, and a backing layer of 15 to 30 micron thickness.

* * * * *